US006088298A

United States Patent [19]

Onat

[11] Patent Number: 6,088,298

[45] Date of Patent: Jul. 11, 2000

[54] MODIFYING THE OPERATIONAL CENTER FREQUENCY OF AN ARRAY

[75] Inventor: Tamer B. Onat, Bristol, R.I.

[73] Assignee: The United States of America as represented by the Secretary of the Navy, Washington, D.C.

[21] Appl. No.: 09/138,467

[22] Filed: Aug. 21, 1998

[51] Int. Cl.[7] .......... H04B 1/00

[52] U.S. Cl. .......... 367/138; 367/153

[58] Field of Search .......... 367/138, 105, 367/119, 153, 154, 1; 73/625, 626

[56] References Cited

U.S. PATENT DOCUMENTS

| | | | |
|---|---|---|---|
| 4,442,713 | 4/1984 | Wilson et al. | 73/626 |
| 4,550,606 | 11/1985 | Drost | 367/105 |
| 5,671,746 | 9/1997 | Dreschel et al. | 128/661.01 |

*Primary Examiner*—Ian J. Lobo
*Attorney, Agent, or Firm*—Michael J. McGowan; Prithvi C. Lall; Michael F. Oglo

[57] ABSTRACT

The present invention modifies an operational center frequency of a transducer array. The array of transducer elements has uniform on-center spacing between adjacent members of the elements having adjacent edges. A controller activates one of a plurality of subsets of the elements that is defined by a pattern throughout the array of activated members of the elements and non-activated members of the elements. The particular pattern in a beamforming direction defines a unique operational center frequency for the array.

18 Claims, 2 Drawing Sheets

MODIFYING THE OPERATIONAL CENTER FREQUENCY OF AN ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to sonar arrays, and more particularly to modifying or setting the operational center frequency of an array by selective activation of transducer elements in the array.

(2) Description of the Prior Art

Arrays of transducer elements are used extensively in a variety of acoustic applications for signal transmission and/or reception. Conventional array designs have a fixed and uniform on-center spacing between adjacent elements in any dimension of the array. For example, square transducer elements arranged in a rectangular array will have a uniform on-center spacing between adjacent elements lying in any two orthogonal dimensions of the array such as the "row" and "column" dimensions. The on-center spacing "d" between elements along with the speed of sound in the medium of transmission define the operational center frequency "$f_c$" of the array in accordance with the relationship $$f_c = \frac{c}{2d} \qquad (1)$$

This relationship is derived for the condition $d \leqq \lambda/2$ in order to prevent grating lobes or aliasing from occurring.

In operation of a conventional two-dimensional array, all elements are generally utilized for transmission to maximize beam power. As is known in the art, a group or groups of elements can be amplitude and/or phase shaded in order to electronically steer the beam in a desired direction. During signal reception, the array can "listen" using the full array or some portion of the array. When using the full array for reception, the output of the array's elements are simply added together with a uniform shading being applied. In the case where beams must be steered, outputs from contiguous region(s) of elements (e.g., vertical staves or lines of adjacent elements, sectors of elements, etc.) are added together or beamformed. However, in each of these cases, the frequency (band) of operation is the same since the on-center spacing "d" is fixed in a contiguous region of elements.

SUMMARY OF THE INVENTION

Accordingly, it is an object of the present invention to provide a method and system for modifying the operational center frequency of an array.

Another object of the present invention is to provide a method and system that can electronically set the transmission and/or reception frequency band of an array of transducer elements.

Other objects and advantages of the present invention will become more obvious hereinafter in the specification and drawings.

In accordance with the present invention, a method and a system are provided for modifying an operational center frequency of a transducer array. An array of transducer elements has uniform on-center spacing between adjacent members of the elements having adjacent edges. A controller activates one of a plurality of subsets of the elements. Each subset is defined by a pattern throughout the array of activated members of the elements and non-activated members of the elements in a beamforming direction to define a unique operational center frequency for the array. In the beamforming direction, each pattern is defined by a unique and uniform on-center spacing between adjacent members of the activated elements.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
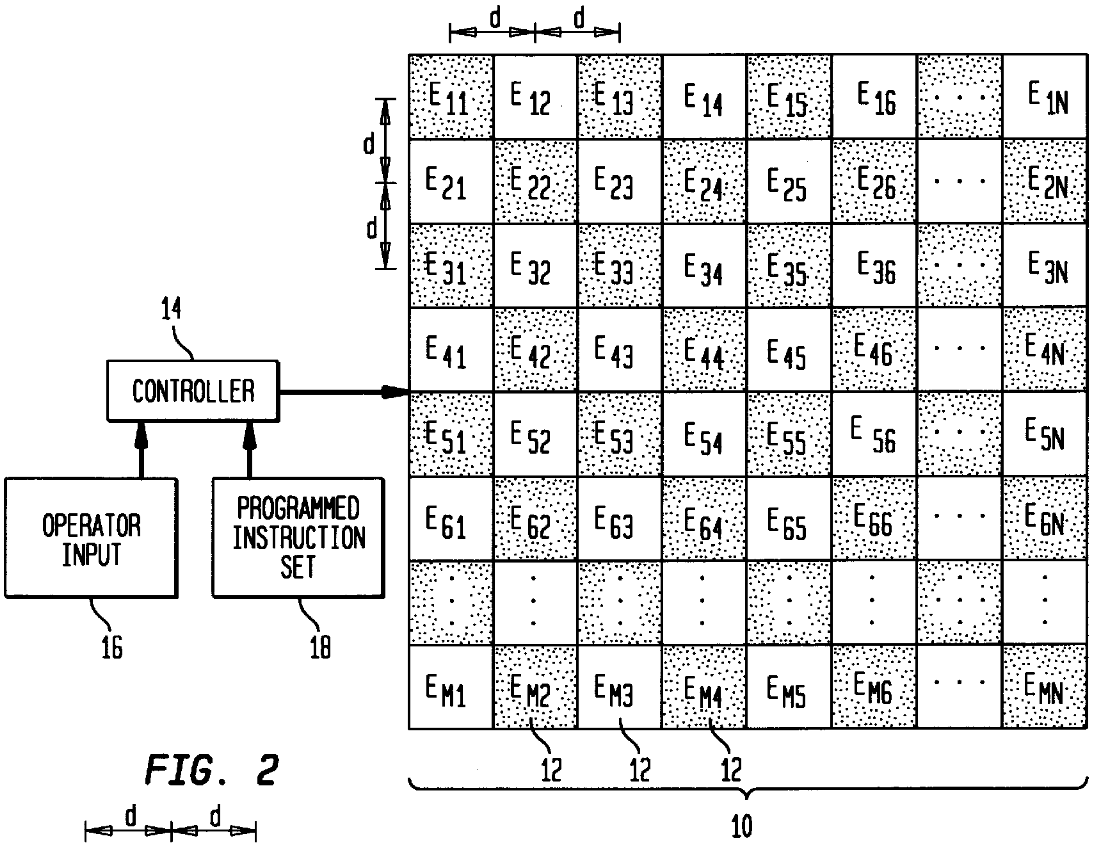
FIG. 1 is a schematic view of a two-dimensional rectangular array of square elements operable at a unique operational center frequency in accordance with the present invention.

Referring now to the drawings, and more particularly to FIG. 1, a first embodiment of the present invention will be described where a two-dimensional M×N array 10 of square transducer elements 12 is shown. For simplicity of illustration, each of elements 12 is shown touching neighboring elements. However, as is known in the art, each of elements 12 are slightly spaced from neighboring elements by an amount dependent on the particular application. This particular intra spacing is not a factor in the present invention. The row and column intra spacing between centers of neighboring elements is d. Each element's identity in array 10 is denoted by $E_{MN}$ where M is a row number and N is a column number. Electrically coupled to each element 12 is a controller 14 for activating and deactivating selected members of elements 12 as controlled by either an operator input 16 or a programmed instruction set 18 coupled to controller 14.

In operation of the device of the present invention, controller 14 activates a pattern of activated members of elements 12 viewed or beamformed in a particular direction. The pattern and its beamforming direction sets the operational center frequency of array 10. The activated set of elements 12 have a uniform on-center spacing between adjacent activated elements in the beamforming direction throughout the array. In FIG. 1, controller 14 activates members of elements 12 (indicated by stippling) along the diagonal staves of array 10. A stave is defined as contiguous elements in a line such as a diagonal of array 10. The uniform on-center spacing between adjacent activated elements in the diagonal beamforming direction in the FIG. 1 embodiment is equal to $$\sqrt{2}d \quad (2)$$

That is, the on-center spacing between elements of a diagonal stave (e.g., between elements $E_{11}$ and $E_{22}$) is equal to $$\sqrt{2}d \quad (3)$$

Thus, the on-center spacing throughout the entire pattern of activated members of elements 12 in the diagonal beamforming direction is the same. As a result, the operational center frequency $f_c$ (i.e., either transmission or reception frequency) of array 10 is defined by $$f_c = \frac{c}{2\sqrt{2d}} \quad (4)$$

Figure 2:
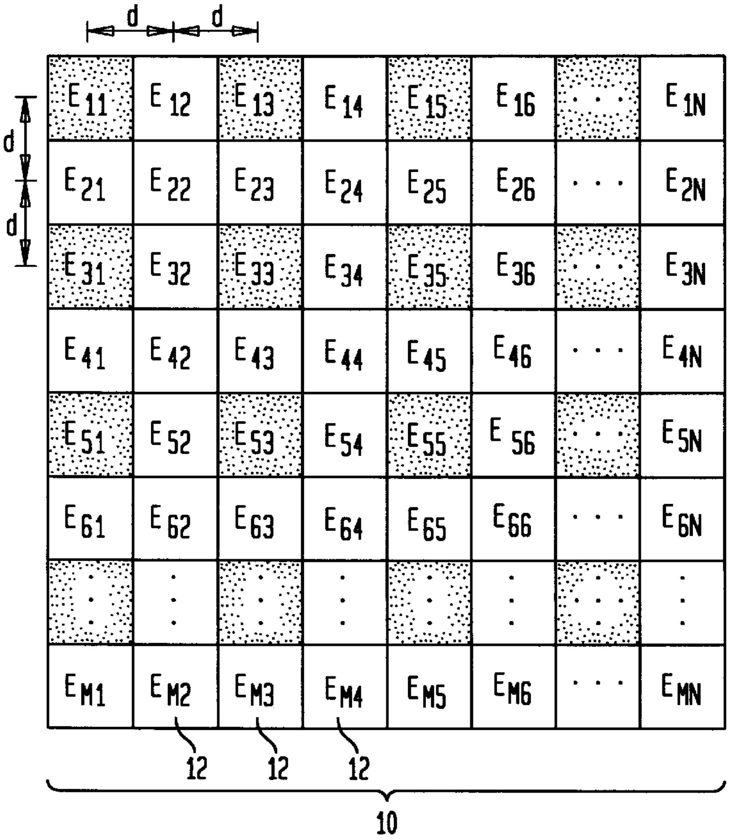
FIG. 2 is a schematic view of the two-dimensional rectangular array of square elements operable at other unique operational center frequencies.

The operational center frequency of array 10 can be re-set or modified in a variety of ways following the basic principle described above. Two such modifications will be described with the aid of FIG. 2. In FIG. 2, the pattern and beamforming direction of activated elements can again be viewed along diagonals of array 10. However, only every other element of every other diagonal is activated so that on-center spacing between adjacent activated elements in the diagonal beamforming direction is $$2\sqrt{2}d \quad (5)$$

That is, the on-center spacing between activated elements of a diagonal (e.g., between $E_{11}$ and $E_{33}$) and the on-center spacing between the nearest diagonals having activated elements (e.g., between $E_{51}$ and $E_{33}$) is equal to $$2\sqrt{2}d \quad (6)$$

When operated in such a fashion, the operational center frequency $f_c$ of array 10 is defined by $$f_c = \frac{c}{2(2\sqrt{2}\,d)} \quad (7)$$

In FIG. 2, the pattern of activated elements and beamforming direction can also be viewed along columns of array 10. More specifically, only every other element of every other column is activated so that the on-center spacing between adjacent activated elements is 2d. That is, the on-center spacing between activated elements of a column (e.g., between elements $E_{11}$ and $E_{31}$) and the on-center spacing between the nearest columns having activated elements (e.g., between $E_{11}$ and $E_{13}$) is 2d. As a result, the operational center frequency $f_c$ of array 10 operated in this fashion is defined by $$f_c = \frac{c}{2(2d)} \quad (8)$$

The advantages of the present invention are numerous. The number of frequencies by which an array can transmit and/or receive signals can be increased without changing the physical configuration of the array. Thus, the present invention can be used to easily expand the capabilities of a transducer array. For example, the array could transmit using all of the elements, but then be tuned to receive at a frequency other than that defined by the physical element-spacing attributes. In another mode of operation, a set of activated elements could be chosen for both transmission and reception so that the operational center frequency would be the same for transmission and reception. In still another mode of operation, one set of activated elements could be used for transmission (at a frequency other than that defined by the physical element-spacing attributes) and another set of activated elements with a different on-center spacing could be used for reception. In this mode, transmission and reception is carried out at unique operational center frequencies which might be of use in a two-way communication system.

Figure 3:
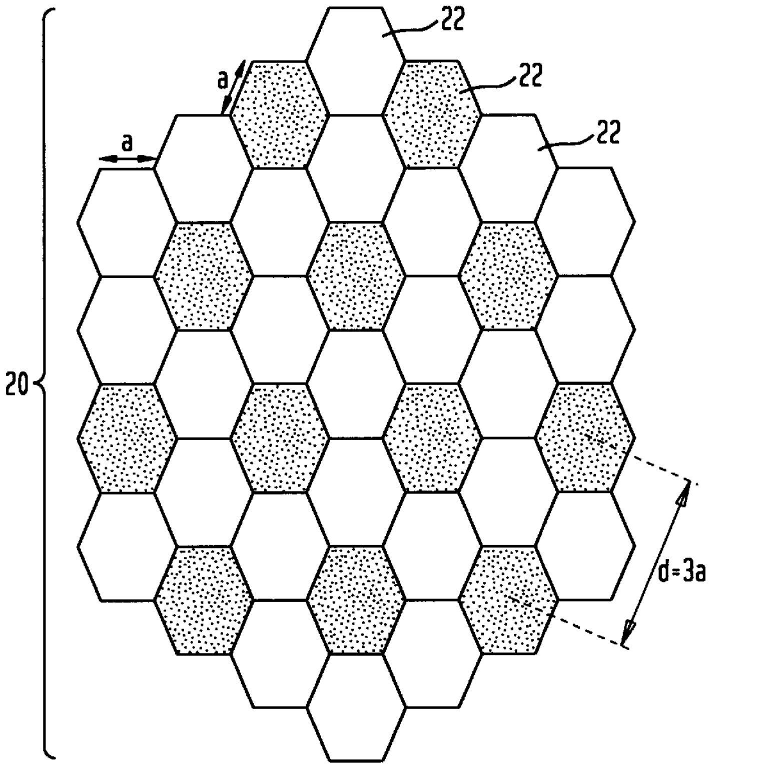
FIG. 3 is a schematic view of a two-dimensional honeycomb array of hexagonal elements configured for a unique operational center frequency in accordance with the present invention.
Figure 4:
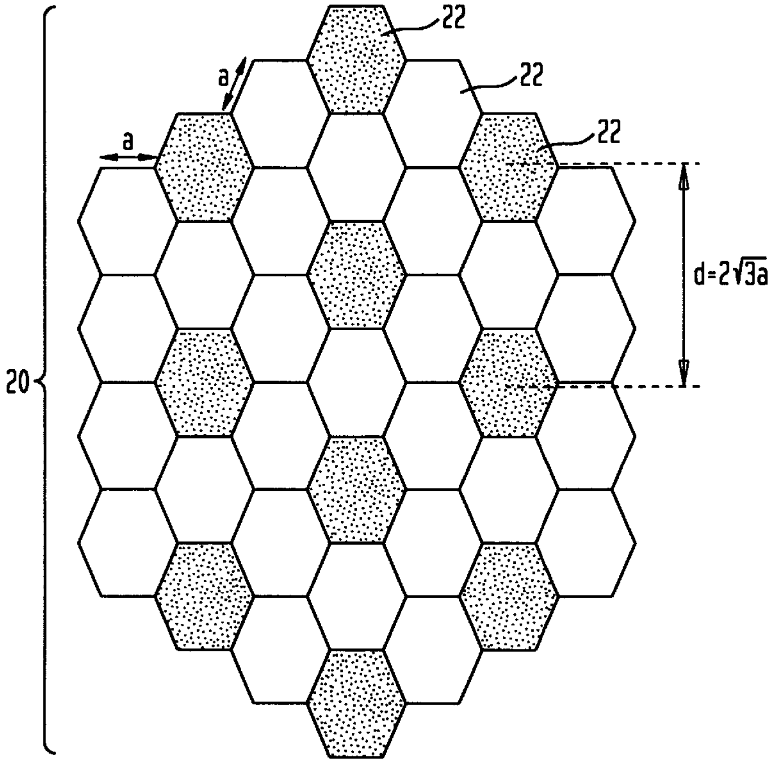
FIG. 4 is a schematic view of the honeycomb array of hexagonal elements configured for another operational center frequency.

The present invention is not limited to use with square transducer elements arranged in rectangular arrays. In general, the present invention can be used with any array of identically-sized and symmetrically shaped elements that, when arranged in an array, have a fixed and uniform on-center spacing between neighboring elements. Two elements are considered to be neighbors at adjacent edges thereof. For example, the present invention could be used with line arrays (i.e., one-dimensional arrays) where spacing of activated elements could be changed by whole number multiples of the physical on-center spacing d. The present invention could also be used with, for example, a honeycomb array 20 of hexagonal transducer elements 22 as shown in FIGS. 3 and 4. All neighboring elements in FIGS. 3 and 4 have a fixed on-center spacing d that is $$\sqrt{3}a \quad (9)$$

where a is the length of one side of a hexagonal element 22.

Applying the principles of the present invention to array 20, a plurality of operational center frequencies can be defined by activating selected members of the elements in a particular beamforming direction while maintaining a uniform on-center spacing between adjacent activated members throughout the array. For example, in FIG. 3, the activated elements and beamforming direction are aligned along the diagonals of the elements and, hence, along diagonals of array 20. More specifically, the uniform on-center spacing between adjacent activated elements in the beamforming direction is 3a. In FIG. 4, the activated elements and beamforming direction are aligned along columns of array 20. More specifically, the uniform on-center spacing between adjacent activated elements in the beamforming direction is equal to $$2\sqrt{3}a \quad (10)$$

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of modifying an operational center frequency of a transducer array, comprising the steps of:

providing an array of transducer elements, said array having uniform on-center spacing between adjacent members of said elements having adjacent edges;

activating one of a plurality of subsets of said elements, each of said plurality of subsets defined by a pattern throughout said array of activated members of said elements and non-activated members of said elements in a beamforming direction to define a unique operational center frequency for said array; and obtaining a plurality of center frequencies for transmission and reception for countermeasure operation using said plurality of transducer element subsets.

2. A method according to claim 1 wherein each said pattern is defined by a unique and uniform on-center spacing between adjacent members of said activated members of said elements in said beamforming direction that determines said unique operational center frequency.

3. A method according to claim 2 wherein said elements are square elements and said array is rectangular, and wherein said step of activating comprises the step of selecting said beamforming direction along diagonals of said array.

4. A method according to claim 2 wherein said elements are square elements and said array is rectangular, and wherein said step of activating comprises the step of selecting said beamforming direction along columns of said array.

5. A method according to claim 2 wherein said elements are hexagonal elements and said array is a honeycomb arrangement of said hexagonal elements, and wherein said step of activating comprises the step of selecting said beamforming direction along diagonals of said array.

6. A method according to claim 2 wherein said elements are hexagonal elements and said array is a honeycomb arrangement of said hexagonal elements, and wherein said step of activating comprises the step of selecting said beamforming direction along columns of said array.

7. A method according to claim 1 further comprising the step of transmitting a signal using all of said elements in said array wherein a transmit center frequency of said signal is defined by said uniform on-center spacing of said array, and wherein said step of activating includes the step of operating said activated members of said elements of said pattern in said beamforming direction in a receiving mode wherein said unique operational center frequency defines a reception center frequency different than said transmit center frequency.

8. A method according to claim 1 further comprising the step of transmitting a signal using a first of said plurality of subsets of said elements wherein a transmit center frequency of said signal is defined by said pattern of said activated members of said elements in said beamforming direction, and wherein said step of activating includes the step of operating said first of said plurality of subsets of said elements in a receiving mode wherein a reception center frequency is defined that is the same as said transmit center frequency.

9. A method according to claim 1 further comprising the step of transmitting a signal using a first of said plurality of subsets of said elements wherein a transmit center frequency of said signal is defined by said pattern of said activated members of said first of said plurality of subsets in a first beamforming direction, and wherein said step of activating includes the step of operating a second of said plurality of subsets of said elements in a receiving mode wherein a reception center frequency is defined by said pattern of said activated members of said second of said plurality of subsets in a second beamforming direction, wherein said reception center frequency is different than said transmit center frequency and thereby obtaining multiple arrays with their center frequency using the same hardware comprising said plurality of transducers.

10. A method of setting an operational center frequency of a transducer array, comprising the steps of:

providing a plurality of identically-sized and symmetrically-shaped transducer elements arranged in a two-dimensional array having a physically fixed and uniform on-center spacing between adjacent members of said elements having adjacent edges;

activating selected members of said elements of a plurality of transducer element subsets to define a pattern throughout said array corresponding to said plurality of transducer element subsets with unique and uniform on-center spacing between adjacent members of said selected members in any two orthogonal dimensions of said array to define a correspondingly unique operational center frequency for said array; and obtaining a multiple center frequency corresponding to each of said plurality of transducer element subsets chosen.

11. A method according to claim 10 further comprising the step of transmitting a signal using all of said elements in said array wherein a transmit center frequency of said signal is defined by said physically fixed and uniform on-center spacing of said array, and wherein said step of activating includes the step of operating said selected members of said elements of said pattern in a receiving mode wherein said unique operational center frequency defines a reception center frequency different than said transmit center frequency.

12. A method according to claim 10 further comprising the step of transmitting a signal using said selected members wherein a transmit center frequency of said signal is defined, and wherein said step of activating includes the step of operating said selected members in a receiving mode wherein a reception center frequency is defined that is the same as said transmit center frequency.

13. A method according to claim 10 further comprising the step of transmitting a signal using a first set of said selected members wherein a transmit center frequency of said signal is defined by said first set, and wherein said step of activating includes the step of operating a second set of said selected members in a receiving mode wherein a reception center frequency is defined by said second set, wherein said reception center frequency is different than said transmit center frequency.

14. A transducer system, comprising:

a plurality of identically-sized and symmetrically-shaped transducer elements arranged in an array having a physically fixed and uniform on-center spacing between adjacent members of said elements having adjacent edges; and a controllable electronic assembly coupled to said array for activating selected members of said elements to define a pattern with unique and uniform on-center spacing between adjacent members of said selected members throughout the array of transducer elements in any two orthogonal dimensions of said array wherein a correspondingly unique operational center frequency for said array is defined.

15. A system as in claim 14 wherein said elements are square elements and said array is rectangular, and wherein said pattern is beamformed along diagonals of said array.

16. A system as in claim 14 wherein said elements are square elements and said array is rectangular, and wherein said pattern is beamformed along columns of said array.

17. A system as in claim 14 wherein said elements are hexagonal elements and said array is a honeycomb arrangement of said hexagonal elements, and wherein said pattern is beamformed along diagonals of said array.

18. A system as in claim 14 wherein said elements are hexagonal elements and said array is a honeycomb arrangement of said hexagonal elements, and wherein said pattern is beamformed along columns of said array.

* * * * *